US008868807B2

(12) United States Patent
Kashima

(10) Patent No.: US 8,868,807 B2
(45) Date of Patent: Oct. 21, 2014

(54) COMMUNICATION SYSTEM, MASTER NODE, AND SLAVE NODE

(75) Inventor: Hideki Kashima, Toyota (JP)

(73) Assignee: Denso Corporation, Kariya (JP)

( * ) Notice: Subject to any disclaimer, the term of this patent is extended or adjusted under 35 U.S.C. 154(b) by 372 days.

(21) Appl. No.: 13/291,415

(22) Filed: Nov. 8, 2011

(65) Prior Publication Data

US 2012/0117287 A1    May 10, 2012

(30) Foreign Application Priority Data

Nov. 8, 2010    (JP) .................................. 2010-249786

(51) Int. Cl.
| G06F 13/42 | (2006.01) |
| G06F 13/00 | (2006.01) |
| G06F 13/368 | (2006.01) |
| G06F 13/36 | (2006.01) |

(52) U.S. Cl.
CPC ...................................... G06F 13/36 (2013.01)
USPC ............ 710/105; 710/106; 710/110; 710/119

(58) Field of Classification Search
USPC ........... 710/30, 105–106, 110, 119, 121, 240, 710/242, 244
See application file for complete search history.

(56) References Cited

U.S. PATENT DOCUMENTS

| 6,434,432 | B1 * | 8/2002 | Hao et al. ........................... 700/1 |
| 6,606,670 | B1 * | 8/2003 | Stoneking et al. ............... 710/14 |
| 2006/0268705 | A1 | 11/2006 | Kurobe et al. |
| 2009/0043932 | A1 * | 2/2009 | Bernardi ........................ 710/110 |
| 2011/0038388 | A1 * | 2/2011 | Hartwich ....................... 370/503 |

FOREIGN PATENT DOCUMENTS

| JP | 06-164603 | 6/1994 |
| JP | 2007-066111 | 3/2007 |
| JP | 2008-543116 | 11/2008 |

OTHER PUBLICATIONS

Voss, Wilfried. "A Comprehensible Guide to Controller Area Network". 2005. Copperhill Technologies Corporation, Amherst, Massachusetts. ISBN0-9765116-0-6. pp. 1, 17, and 34-42.*
"CAN Specification". Version 2.0. Sep. 1991. Robert Bosch GmbH, Postfach 30 02 40, D-70442 Stuttgart.*
Watterson, Conal. "Controller Area Netowrk (CAN) Implementation Guide". Application Note AN-1123. 2012. Analog Devices, Inc., Norwood, Massachusetts.*
"The I2C Bus Specification". Version 2.1. Jan. 2000. Philips Semiconductors. Document Order No. 9398 393 40011.*
M. Sato, "Detailed Description Of Vehicle Network System", Dec. 1, 2005, pp. 70-77 (with partial English translation).
U.S. Appl. No. 13/200,738, filed Sep. 29, 2011, Kaneko et al.
Office Action issued Aug. 7, 2012 in corresponding Japanese Application No. 2010-224214 relating to co-pending U.S. Appl. No. 13/200,738, with English translation.

\* cited by examiner

*Primary Examiner* — Thomas J Cleary
(74) *Attorney, Agent, or Firm* — Harness, Dickey & Pierce, PLC

(57) ABSTRACT

In a communication system, a bus allows information to be communicated thereon as signals. Each of the signals has an electrical dominant level thereon and an electrical recessive level thereon. The electrical dominant level is asserted on the bus in priority to the electrical recessive level. Each of a master node and at least one autonomous communicating slave node detects that the bus is in an idle state when the electrical recessive level on the bus is continued for a predetermined period or more, transmits a corresponding header via the bus after detection of the bus being in the idle state, and performs arbitration on the bus based on the corresponding header.

5 Claims, 9 Drawing Sheets

(a)

(b)

(c)

EACH DATA IS CHANGED FROM RECESSIVE TO DOMINANT IF SECOND CODE COLLIDES WITH FIRST CODE (SEE FIG.7)

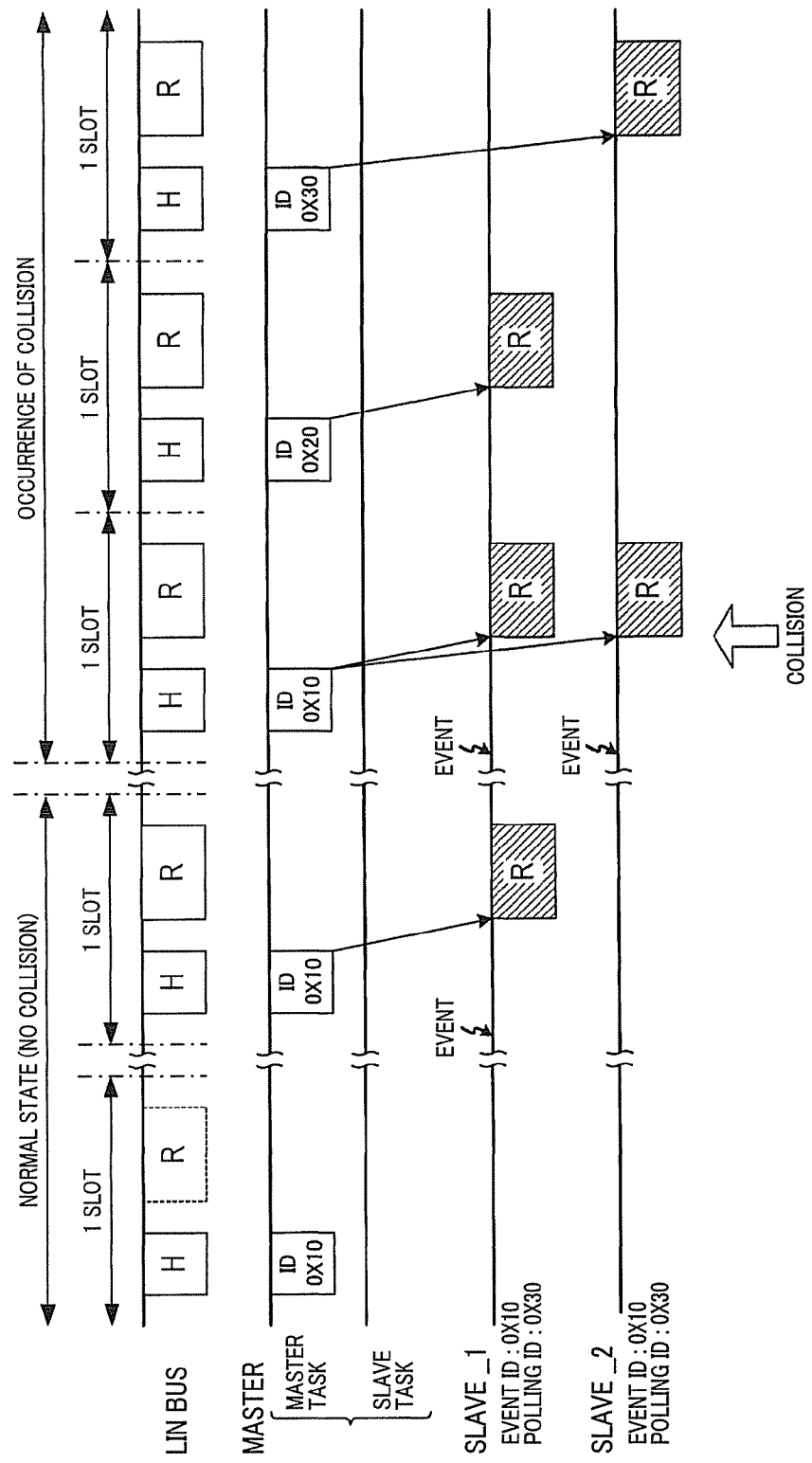

COMMUNICATION SYSTEM, MASTER NODE, AND SLAVE NODE

CROSS REFERENCE TO RELATED APPLICATIONS

This application is based on Japanese Patent Application 2010-249786 filed on Nov. 8, 2010. This application claims the benefit of priority from the Japanese Patent Application, so that the descriptions of which are all incorporated herein by reference.

TECHNICAL FIELD

The present disclosure relate to communication systems using master-slave communication protocols.

BACKGROUND

There are well-known master-slave communication protocols. In accordance with a master-slave communication protocol as a typical example of the master-slave communication protocols, polling is performed. Specifically, a master node transmits a header with an ID, and a slave node, which is associated with the ID of the header, transmits data as a response to a network; the set of the header and corresponding response is communicated through the network as a frame. A master node will be referred to simply as a master, and a slave node will be referred to simply as a slave.

In the master-slave communication protocol, a slave passively sends data when only receiving a corresponding one of headers sent from a master in accordance with a predetermined schedule. For the master-slave communication protocol, if an event occurs in a slave, there is a requirement to immediately inform another node of the event. In order to meet such a requirement, installation, in a master-slave communication protocol, of a mechanism has been proposed; the mechanism allows slaves to autonomously transmit data without waiting for data sending timings in accordance with schedules predetermined by masters.

For example, in LIN (Local Internet Network) protocol, as an example of these master-slave communication protocols, which is applied for in-vehicle networks, headers for event-triggered frames are prepared in addition to headers for unconditional frames. A header of an event-triggered frame causes a slave detecting the occurrence of an event to transmit, via a LIN bus, a response, and a header of an unconditional frame causes a slave identified by the header to transmit, via the LIN bus, a response.

Specifically, in the LIN protocol, when detecting the occurrence of an event, a slave is triggered to send a response using an event triggered frame (see "DETAILED DESCRIPTION OF VEHICLE NETWORK SYSTEM", MICHIO SATO, published on Dec. 1, 2005, CQ PUBLISHING CO., LTD).

In addition, the following communication method is disclosed in Japanese Patent Application Publication NO. 2007-066111. In the communication method, pieces of output data from a master are collectively transferred via a bus to slaves in a single OUT frame, and pieces of input data from the slaves are replied in their IN frames at their non-overlappedly allocated time slots to the master via the bus. This can implement regular communications between the master and the slaves. Additionally, in the communication method, when the master identifies, in an OUT frame, one or more slaves that the master wants to check for whether there are messaging requirements therein, and the identified one or more slaves reply a response frame indicative of messaging requirements, the master transmits a messaging allowance frame to at least one slave that has replied the response, thus passing, to the at least one slave, authority to the bus. This results in that the at least one slave with the authority to the bus can transmit messages to the master. That is, the communication method disclosed in the Patent Publication allows each slave to actively transmit data to, for example, the master.

SUMMARY

In the LIN protocol, the header, referred to as an event header, of an event-triggered frame can be associated with slaves, which is different from the header of an unconditional frame; the header of an unconditional frame is associated with a single slave. For this reason, as illustrated in FIG. 9, if a slave_1 and a slave_2, both of which are associated with the event header "H" of the ID "0x10 (hex 10)" and they simultaneously send responses "R" when events occur in the slaves_1 and _2, there is a collision between these responses R. Note that, in FIG. 9, the ID of "0x10" is used as the common event header for the slaves_1 and _2, and IDs of "0x20" and "0x30" are used for uniquely identifying the respective slaves_1 and _2 for unconditional frames (for polling of the slaves_1 and _2). 1 SLOT (FLAME SLOT) represents time allocated for sending one frame (header and response) through the LIN bus.

If a collision between the responses R from the slaves_1 and _2 is detected in the corresponding slot (the first slot at the collision), the colliding responses R are discarded, and the master transmits, to one of the corresponding slaves_1 and _2, such as the slave_1, the header (ID of "0x20") identifying the slave_1 that should respond it in the following second slot, and transmits, to the other of the corresponding slaves_1 and _2, such as the slave_2, the header (ID of "0x30") identifying the slave_2 that should respond it in the following third slot.

However, the aforementioned method for addressing a collision between responses from slaves requires corresponding colliding slaves to successively send their responses. This may result in a reduction of communication efficiency in communications using the LIN protocol.

In addition, in order to allow a slave to actively send data to the master, the communication method disclosed in the Patent Publication NO. 2007-066111 requires:

the sending of an OUT frame from the master to a specified slave;

the sending of a response frame from the specified slave to the master; and the sending of a messaging allowance frame from the master to the specified slave.

In other words, the communication method disclosed in the Patent Publication NO. 2007-066111 allows a slave to actively send data to the master only when these three frames (OUT frame, response frame, and messaging allowance frame) have been communicated.

Thus, the communication method disclosed in the Patent Publication NO. 2007-066111 makes complicated the communication procedure to allow a slave to actively send data to the master. This may result in both: a reduction of communication efficiency in communications on the bus using the communication method, and a difficulty to immediately inform the master of the occurrence of an event.

In view of the circumstances set forth above, one aspect of the present disclosure seeks to provide communication systems each comprised of a master node and a plurality of slave nodes communicably coupled to the master node via a bus, which are designed to address at least one of the problems set forth above.

Specifically, an alternative aspect of the present disclosure aims to provide such communication systems capable of actively sending data from a slave node immediately with higher communication efficiency.

In addition, a further aspect of the present disclosure aims to provide a master node communicably coupled to a plurality of slave nodes via a bus; the master allows a slave to actively send data immediately with higher communication efficiency. A still further aspect of the present disclosure seeks to provide a slave node communicably coupled to a master node via a bus; the slave node is capable of actively sending data immediately with higher communication efficiency.

According to one aspect of the present disclosure, there is provided a communication system including: a bus; a master node; and a plurality of slave nodes communicably coupled to the master node through the bus. The bus allows information to be communicated thereon as signals, each of the signals having an electrical dominant level thereon and an electrical recessive level thereon, the electrical dominant level being asserted on the bus in priority to the electrical recessive level. At least one of the plurality of slave nodes is constructed as at least one autonomous communicating slave node configured to autonomously transmit a corresponding header indicative of data required to be autonomously transmitted via the bus. The master node is configured to transmit a corresponding header with an identification of data allowed to be transmitted while changing the identification; one of the plurality of slave nodes including the data is configured to receive the header from the master node and transmit the received header from the master node and the data following the received header. Each of the master node and the at least one autonomous communicating slave node is configured to: detect that the bus is in an idle state when the electrical recessive level on the bus is continued for a predetermined period or more; transmit the corresponding header via the bus after detection of the bus being in the idle state; and perform arbitration on the bus based on the corresponding header.

With the configuration of the communication system, the at least one autonomous communicating slave node is configured to autonomously transmit a corresponding header indicative of data required to be autonomously transmitted via the bus. For example, when informing another node of an event generated in the at least one autonomous communicating slave node or when urgently requiring data managed in an alternative node, the at least one autonomous communicating slave autonomously transmit a corresponding header indicative of data required to be autonomously transmitted via the bus.

Specifically, each of the master node and the at least one autonomous communicating slave node is configured to detect that the bus is in an idle state when the electrical recessive level on the bus is continued for a predetermined period or more, and transmit the corresponding header via the bus after detection of the bus being in the idle state. This configuration allows each of the master node and the at least one autonomous communicating slave node to immediately transmit a corresponding header without waiting for instructions from the master node without using specific frames for communicating between the master node and the at least one autonomous communicating slave node. This makes it possible to immediately transmit urgent information to another node and immediately receive urgent infatuation from another node.

In addition, if there is a collision between a transmitted header from each autonomous slave node and a transmitted header from another node, each autonomous slave node performs arbitration on the bus based on the transmitted header. Thus, data communications can be performed based on one of the transmitted headers; the one of the transmitted headers wins the arbitration on the bus.

According to another aspect of the present disclosure, there is provided a master node communicably coupled to a plurality of slave nodes through a bus, in which the bus allows information to be communicated thereon as signals. Each of the signals has an electrical dominant level thereon and an electrical recessive level thereon. The electrical dominant level is asserted on the bus in priority to the electrical recessive level. The master node includes an idle state detector configured to detect the bus is in an idle state when the electrical recessive level on the bus is continued for a predetermined period or more, and a regular header transmitter configured to transmit, via the bus, a regular header with an identification of data allowed to be transmitted while changing the identification after detection of the bus being in the idle state. One of the plurality of slave nodes includes the data being configured to receive the regular header and transmit the received regular header and the data following the regular header. The master node includes a stop unit configured to monitor electrical signal level on the bus and stop transmission of the regular header when the monitored electrical signal level on the bus is different from an electrical signal level of the transmitted regular header on the bus.

According to a further aspect of the present disclosure, there is provided a slave node communicably coupled to a master node through a bus, in which the bus allows information to be communicated thereon as signals. Each of the signals has an electrical dominant level thereon and an electrical recessive level thereon, and the electrical dominant level is asserted on the bus in priority to the electrical recessive level. The slave node includes a first transmitter configured to, when a regular header with an identification of data allowed to be transmitted is transmitted, receive a regular header and to transmit, via the bus, the received regular header and the data following the regular header if the data is included in the slave node, and an idle state detector configured to detect the bus is in an idle state when the electrical recessive level on the bus is continued for a predetermined period or more. The slave node includes an event header transmitter configured to autonomously transmit a corresponding event header indicative of data required to be autonomously transmitted via the bus, and a stop unit configured to monitor electrical signal level on the bus and stop transmission of at least one of the regular header and the event header when the monitored electrical signal level on the bus is different from an electrical signal level of the transmitted at least one of the regular header and the event header on the bus.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be constructed as limiting other embodiments or the claims.

BRIEF DESCRIPTION OF THE DRAWINGS

Other aspects of the present disclosure will become apparent from the following description of an embodiment with reference to the accompanying drawings in which:

FIG. 9 is a timing chart schematically illustrating basic operations of a conventional communication system.

DETAILED DESCRIPTION OF EMBODIMENT

Figure 1:
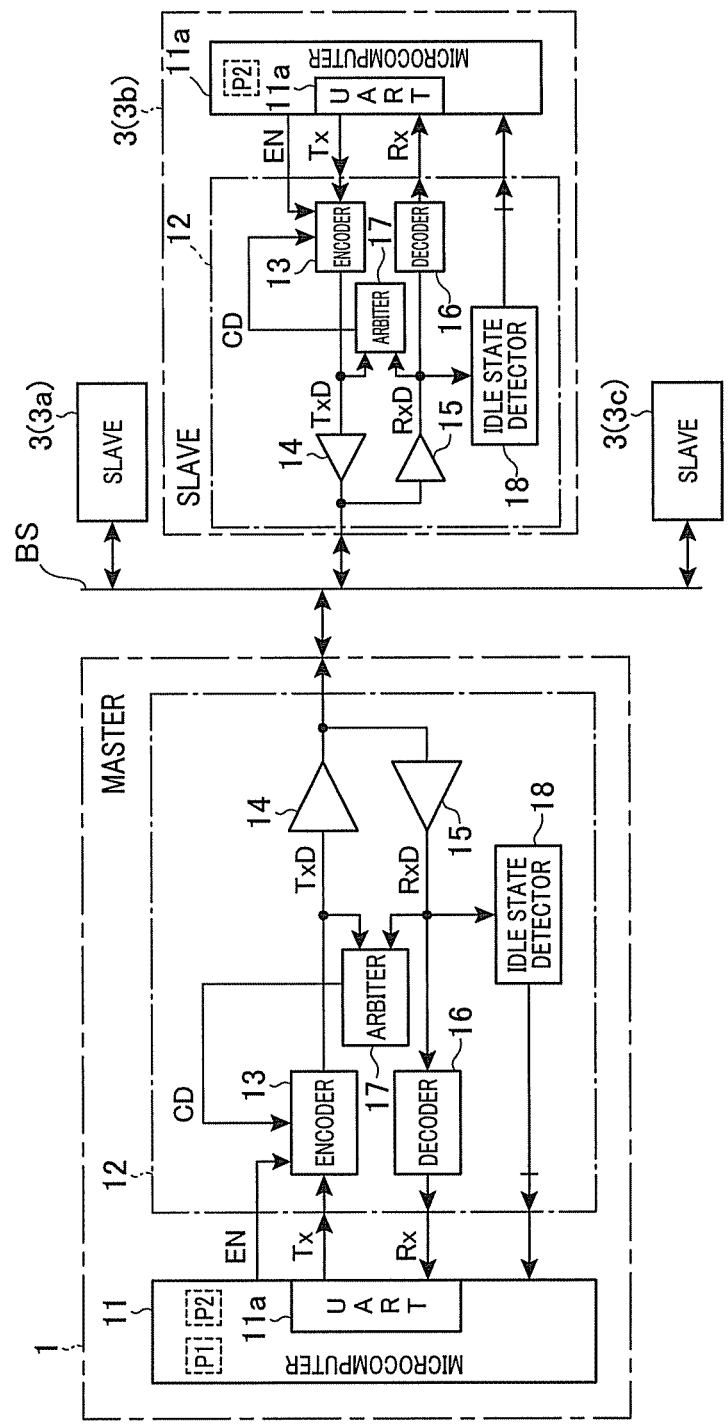
FIG. 1 is a circuit diagram schematically illustrating an example of the overall structure of a communication system according to an embodiment of the present disclosure.

An embodiment of the present disclosure will be described hereinafter with reference to the accompanying drawings. In the embodiment, like parts between the embodiments, to which like reference characters are assigned, are omitted or simplified in redundant description.

An example of the overall structure of a communication system for vehicles according to the embodiment is illustrated in FIG. 1; to the communication system, a preselected master-slave communication protocol, such as LIN protocol, is applied.

The communication system includes a master node 1, a plurality of slave nodes 3 (3a, 3b, 3c, ...) to be controlled by the master node 1, and a bus BS through which the master node 1 is communicably coupled to the slave nodes 3. Note that a node is, for example, a hardware computing terminal or a software module.

For example, in this embodiment, the slave nodes 3 are installed in plural types of target devices; these plural types of target devices are provided in a target vehicle for detecting the operating conditions of the target vehicle, controlling them and/or actuating corresponding parts of the target vehicle.

The master node 1 is operative to communicate with the slave nodes 3 via the bus BS to thereby obtain the operating conditions of the target vehicle, and/or instruct the slaves 3 to control and/or actuate the corresponding target devices for control of the target vehicle. The master node 1 will be referred to simply as the master 1, and the slave nodes 3 will be referred to simply as the slaves 3.

In the preselected master-slave protocol, the master 1 operates in a polling mode (regular communication mode, passive communication mode) to successively designate pieces of data that the master 1 allows to send, and thus designate corresponding slaves 3 as the senders of the pieces of data. In other words, the master 1 performs polling of the corresponding slaves 3. Then, each of the slaves 3 as the senders of the designated pieces of data operates in the polling mode to send a corresponding piece of data.

On the other hand, a slave 3 operates in an event mode (irregular communication mode, active communication mode) to perform event communications in which the slave 3 autonomously controls communications regardless of instructions from the master 1.

Note that, in this embodiment, the slaves 3 include a slave 3a with only a first function of sending data (a response) according to instructions from the master 1, and a slave 3b with the first function and a second function of starting the event communications. Such a slave 3a will be referred to as an available slave, and such a slave 3b will also be referred to as an autonomous communicating slave.

In this embodiment, the master 1 consists of an electronic control unit (ECU) communicably coupled to an in-vehicle network to which a CAN (Controller Area Network) protocol is applied. The master 1 according to this embodiment is operative to carry out automotive-body applications of the target vehicle. For example, if the master 1 is an ECU for controlling door applications of the target vehicle, control/actuate devices for automotive-body parts, such as mirrors, door locks, windows, and so on can be used as the target devices installed with the slaves 3 (3a, 3b, 3c, ...).

Note that a plurality of masters 1 can be provided in the target vehicle; each of these masters 1 can control a corresponding plurality of slaves 3. As the target devices installed with the slaves 3, control/actuate devices for other automobile parts, such as sunroofs, wipers, air conditioners, steering, lights, and so on can be used. Particularly, the autonomous communicating slave 3b is capable of operating in the polling mode according to instructions from the master 1 and of detecting the occurrence of an event (for example, a driver's operation, such as open or close of a corresponding door), and informing the master 1 of the occurrence of the event.

The bus BS has two states (logical levels): dominant state (the logical low level) and recessive state (the logical high level). For example, the dominant (logical low level) corresponds to, for example, a ground level (logical 0), and the recessive corresponds to, for example, a level (logical 1) of a battery (not shown). If signals are simultaneously transmitted from nodes via their transmit buffers (described later), the level on the bus BS is the dominant as long as at least one of the signals has the logical low level (dominant). This structure of the bus BS and the transmit buffer of each node can be implemented using, for example, a single wire, common open-collector circuits, and pull-up resistors. That is, when there is a collision on the bus BS a first signal of the dominant from a first node and a second signal of the recessive from a second node, the first node wins on bus arbitration whereas the second node loses thereon.

Hereinafter, a period within which a predetermined number of recessive bits (bits each with the recessive) are continued on the bus BS will be referred to as IFS (Inter Frame State), and if the IFS is detected as the current state of the bus BS, the bus BS is in idle state.

The master 1 and the slaves 3 according to this embodiment operate in accordance with the preselected master-slave protocol. In the master-slave protocol, the master 1 is designed to communicate with the slaves 3 using frames each of which is a unit of data to be transmitted and received via the bus BS.

Figure 2:
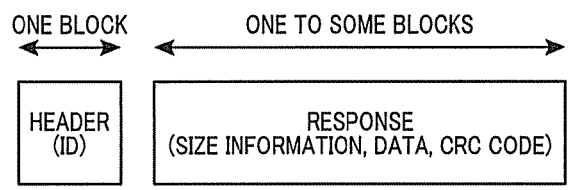
FIG. 2 is a view schematically illustrating the structure of a frame to be used in the communication system, the structure of data to be communicated between a microcomputer and a transceiver of the communication system, and the structure of encoded data according to the embodiment.
Figure 2:
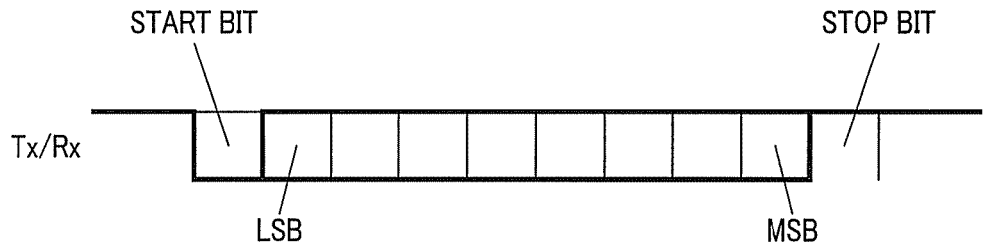
Figure 2:
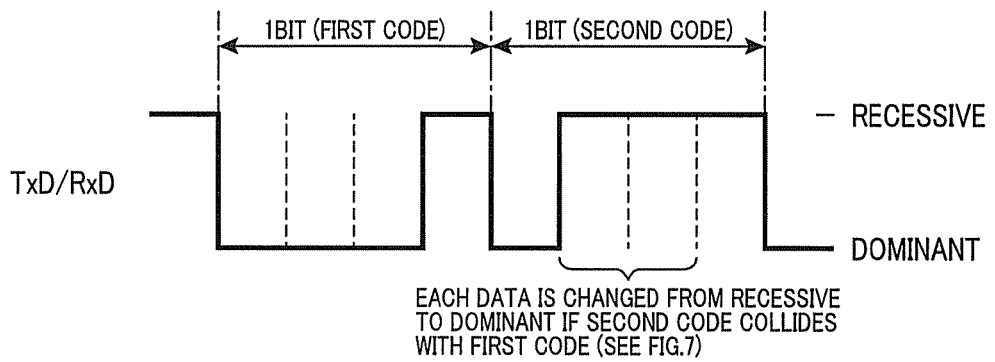

(a) of FIG. 2 schematically illustrates the structure of a frame according to this embodiment.

As illustrated in (a) of FIG. 2, a frame is comprised of a header (H) for specifying data that the master 1 allows to send, and a variable-length response including the data specified by the header. The header of a frame consists of an ID of data that the master 1 allows to send. Such a frame is designed such that, the lower the value of the header is, the higher the possibility (probability) of the frame wining on bus arbitration is. The response of a frame at least includes corresponding data to be sent, information indicative of the size of the data (the size of the corresponding response), and a CRC (Cyclic Redundancy Check) code as an example of error detection codes for checking errors in the data. As a result, data is sent through the bus BS as a frame (message frame) containing the set of a header and a response. One slot is allocated for one frame on the bus BS and required for passing the one frame.

Note that an ID is a number allocated to data included in a corresponding node for unique identification thereof, but allocated to a corresponding node for unique identification thereof.

Next, an example of the overall structure of each node, in other words, each of the master 1 and a slave 3 will be described.

Referring to FIG. 1, the master 1 is comprised of a microcomputer 11 and a transceiver 12. The microcomputer 11 is communicable with the transceiver 12, and operative to carry out tasks to communicate with slaves 3 and other ECUs. The transceiver 12 is connected with the bus BS. The transceiver 12 is operative to monitor the current state of the bus BS, and to supply, to the microcomputer 11, an idle detection signal IDL indicative of whether the bus BS is in the idle state or not.

The transceiver 12 is also operative to: encode data Tx provided from the microcomputer 11 into transmit data TxD; output the transmit data TxD to the bus BS; receive data (received data) RxD on the bus BS; decode the received data RxD into data Rx; and input the decoded data Rx to the microcomputer 11.

The transceiver 12 is further operative to generate a collision detection signal CD with a preset active level (high level or low level) to feed it to the microcomputer 11 when transmit data TxD outputted from the local node is rewritten on the bus BS, in other words, the transmit data TxD loses bus arbitration upon collision between the transmit data TxD and output data from another node.

The microcomputer 11 is comprised of a UART (Universal Asynchronous Receiver Transmitter) 11a in addition to a common main module including a CPU, a ROM, a RAM, an IO port, and one or more peripherals; this UART 11a is operative to carry out serial start-stop communications (serial asynchronous communications). The UART 11a can be designed as a hardware circuit or a software module.

The UART 11a uses NRZ (Non-Return to Zero) code. Specifically, each of data Tx to be transmitted from the UART 11a and data Rx to be received thereinto consists of a logical low start bit with one-bit length, a configurable number of data bits (8 bits in this embodiment), and one or more logical high stop bits (one stop bit in this embodiment). The start bit represents the start of the corresponding data Tx/Rx, and the stop bit represents the stop of the corresponding data Tx/Rx. That is, each of data Tx and data Rx according to this embodiment is designed as 10-bit block data. The first data bit of the 8-bit data as the main part of data Tx or Rx is the least significant bit (LSB), and the last data bit thereof is the most significant bit (MSB).

In this embodiment, a header to be sent from a node is comprised of 10-bit block data transmittable or receivable by the UART 11a at a time set forth above (see FIG. (a) of FIG. 2). 7 bits in the 8-bit data in data Tx or Rx can be used to set an ID, and the remaining 1 bit can be used as a parity bit. A response to be sent from a node is comprised of a predetermined number of, such as one or more, pieces of block data. The size information can be stored in the first block in a response (see (a) of FIG. 2).

The transceiver 12 is comprised of an encoder 13, a transmit buffer 14, a receive buffer 15, a decoder 16, an arbiter 17, and an idle state detector 18.

The encoder 13 is operative to encode data Tx in NRZ code supplied from the microcomputer 11 into transmit data TxD in code used on the bus BS. The transmit buffer 14 is operative to transmit the transmit data TxD encoded by the encoder 13 to the bus BS, and the receive buffer 15 is operative to capture data in PWM code on the bus BS as received data RxD. The decoder 16 is operative to decode the received data RxD in PWM code into data Rx, and feed the decoded data Rx to the microcomputer 11. The arbiter 17 is operative to output a collision detection signal CD if the transmit data TxD sent from the encoder 13 and the received data RxD is mismatched in level with each other.

As described above, if signals are simultaneously transmitted from the transmit buffers 14 of nodes, the level on the bus BS is the dominant as long as at least one of the signals has the logical low level (dominant). That is, on the bus BS, if a signal has the logical high level, the signal is the recessive (recessive data), and if a signal has the logical low level, the signal is the dominant (dominant data). This structure of the bus BS and the transmit buffer 14 of each node can be implemented using, for example, a single wire, common open-collector circuits, and pull-up resistors.

The receive buffer 15 is designed as, for example, a common comparator, and operative to output the logical high level if the level on the bus BS is higher than a preset threshold level, and the logical low level if the level on the bus BS is lower than the preset level.

For example, as illustrated in (c) of FIG. 2, the encoder 13 is operative to:

divide the length of each bit of data Tx into quarters;

convert a corresponding bit of the data Tx into the first code if the corresponding bit is the logical low level, the first code consisting of the logical low levels in the former three-quarters of the corresponding bit, and the logical high level in the later quarter thereof; and convert the corresponding bit of the data Tx into the second code if the corresponding bit is the logical high level, the second code consisting of the logical low level in the former quarter of the corresponding bit, and the logical high levels in the later three-quarters thereof.

That is, the encoder 13 is operative to convert an NRZ code into a PWM code.

In contrast, the decoder 16 is operative to convert the first code of received data RxD into a bit of the logical low level, and convert the second code of the received data RxD into a bit of the logical high level.

That is, the decoder 16 is operative to convert a PWM code into an NRZ code.

Particularly, the encoder 13 according to this embodiment is configured to supply transmit data TxD encoded thereby in accordance with data Tx to the transmit buffer 14 upon the collision detection signal CD with the non-active level, and, if the collision detection signal CD is changed to the active level, supply transmit data TxD whose levels are fixed to the high levels (recessives) until an enabling signal EN is inputted from the microcomputer 11 to the encoder 13.

The arbiter 17 is comprised of, for example, an XOR gate, and designed to compare transmit data TxD with received data RxD in bits.

Specifically, on the bus BS, when there is a collision between the first code (Tx=0) in first transmit data TxD from a node and the second code (Tx=1) in second transmit data TxD from an alternative node, the first code in the first transmit data TxD wins on bus arbitration whereas the second code loses thereon so that the first code is continuously transmitted with the second code being rewritten into the first code. Thus, as a result of the collision, the alternative node, the collision detection signal CD outputted from the arbiter 17 of the alternative node is changed to the active level because the second code in the second transmit data TxD transmitted from the alternative node is mismatched with the first code in the received data RxD captured from the bus BS.

The idle state detector 18 is configured to monitor the current state of the bus BS based on received data RxD, and to supply, to the microcomputer 11, the idle detection signal IDL indicative of whether the bus BS is in the idle state or not.

An autonomous communicating slave 3b has a substantially identical structure of the master 1 except that some tasks to be carried out by the microcomputer 11 of the autonomous communicating slave 3b are different from those to be carried out by the microcomputer 11 of the master 1. A normal slave 3a has a substantially identical structure of the master 1 except that: some tasks to be carried out by the microcomputer 11 of the available slave 3a are different from those to be carried out by the microcomputer 11 of the master 1; and, from the transceiver 12 of the available slave 3a, the arbitrator 17 and the idle state detector 18 are omitted.

The microcomputer 11 of the master 1 is operative to run a master task that controls, in accordance with a previously established schedule, the sending of a header, and to run a slave task that allows the master 1 to send a response.

On the other hand, the microcomputer 11 of each slave 3 is operative to run a slave task that allows the corresponding slave 3 to send a response.

Note that the slave task to be performed by the available slave 3a is identical to the slave task to be performed by the master 1; the slave task to be performed by the master 1 is to send a response. In contrast, the slave task to be performed by the autonomous communicating slave 3b includes a function of sending a header in addition to the slave task to be performed by the available slave 3a.

Moreover, the microcomputer 11 of each of the master 1 and the slaves 3 is configured to perform corresponding unique functions allocated for a corresponding one of the master 1 and the slaves 3. During execution of a corresponding unique function, the microcomputer 11 of each of the master 1 and the slaves 3 is configured to generate data to be sent as a response, and/or generate a request of event communications (a request of shift to the event mode); this request includes specified data to be sent in the event mode.

Next, the master task to be carried out by the microcomputer 11 of the master 1 in accordance with a corresponding master-task program P1 stored in the microcomputer 11 will be described hereinafter with reference to FIG. 3.

The master task (master-task program P1) is launched when execution of an initializing process allows the bus BS to be used after the master 1 is powered on.

When the master task is launched, the microcomputer 11 of the master 1 determines whether a request of event communications is generated in the local master 1 (the master 1 itself) in step S110; this request includes specified data to be sent in the event mode. When determining that the request of event communications is not generated in the master 1, the microcomputer 11 determines whether there is timing for sending a header in the regular communication mode according to the previously established schedule in step S140; this header will be referred to as a regular header.

When determining that there is not timing for sending a regular header (NO in step S140), the microcomputer 11 returns to step S110, and repeats the determinations in step S110 and S140 until the determination of any of steps S110 and S140 is affirmative.

When determining that the request of event communications is generated in the master 1 (YES in step S110), the microcomputer 11 operates in the event communication mode to determine whether IFS is detected by the idle state detector 18, in other words, whether the idle detection signal IDL is the active level in step S120. This determination in step S120 represents a determination of whether the bus BS is in the idle state. When determining that IFS is not detected by the idle state detector 18 (NO in step S120), the microcomputer 11 repeats the determination in step S120. Otherwise, when determining that IFS is detected by the idle state detector 18 (YES in step S120), the microcomputer 11 transmits an event header consisting of an ID of the specified data by the request of event communications in step S130.

On the other hand, when determining that there is timing for sending a regular header (YES in step S140), the microcomputer 11 determines whether IFS is detected by the idle state detector 18 in step S150. When determining that IFS is not detected by the idle state detector 18 (NO in step S150), the microcomputer 11 returns to step S110, and repeats the operations from step S110. Otherwise, when determining that IFS is detected by the idle state detector 18 (YES in step S150), the microcomputer 11 operates in the regular communication mode to send a regular header consisting of an ID of data that the master 1 allows to send in step S160.

Note that regular headers are transmitted by the microcomputer 11 of the master 1 at previously determined regular intervals, such as 100 milliseconds (ms). The ID to be set to a regular header is updated in the previously established schedule such that all pieces of data, which should be shared by all the nodes connected to the bus BS, are successively specified.

After completion of the sending of an event header in step S130, the microcomputer 11 receives a header via the bus BS, and determines whether the ID (received ID) set to the received header is matched with the ID (transmitted ID) set to the header to be transmitted thereby in step S163.

When determining that the received ID is matched with the transmitted ID (YES in step S163), the microcomputer 11 clears a retransmit flag in step S165; this retransmit flag has been automatically set since timing when a header was transmitted, in step. S130. Thereafter, the microcomputer 11 returns to step S110, and repeats the master task from step S110. Otherwise, when determining that the received ID is not matched with the transmitted ID (NO in step S165), the microcomputer 11 determines that the transmit header probably loses on bus arbitration. Then, the microcomputer 11 returns to step S110, and repeats the master task from step S110 with the retransmit flag being set.

If the retransmit flag has been set, the microcomputer 11 performs an affirmative determination when the previously transmitted header is a regular header (YES in step S140), thus retransmitting the previously transmitted regular header. This makes it possible to retransmit a header when the regular header has lost on bus arbitration.

On the other hand, after completion of the sending of an event header in step S130, the microcomputer 11 receives a header via the bus BS. Next, in step S170, the microcomputer 11 determines whether the ID (received ID) set to the received header is matched with the ID (transmitted ID) set to the header to be transmitted thereby in step S130.

When determining that the received ID is matched with the transmitted ID (YES in step S170), the microcomputer 11 clears a retransmit flag in step S180; this retransmit flag has been automatically set since timing when a header was transmitted in step S130. Thereafter, the microcomputer 11 returns to step S110, and repeats the master task from step S110.

Otherwise, when determining that the received ID is not matched with the transmitted ID (NO in step S170), the microcomputer 11 determines that the transmit header probably loses on bus arbitration. Then, the microcomputer 11 returns to step S110, and repeats the master task from step S110 with the retransmit flag being set.

In step S110, if the retransmit flag has been set, the microcomputer 11 performs an affirmative determination when the previously transmitted header is an event header (YES in step S110), thus retransmitting the previously transmitted event header. This makes it possible to retransmit a header when the header has lost on bus arbitration.

Specifically, the master task performs event communications, that is, the sending of an event header in higher priority than regular communications, that is, the sending of a regular header if a request of event communications is synchronized with a timing of regular communications. If a header transmitted thereby loses on bus arbitration, the master task repeats retransmitting of the header until the header is successively transmitted without being lost on bus arbitration.

Next, the slave task to be carried out by the microcomputer 11 of the autonomous communicating slave 3b in accordance with a corresponding slave-task program P2 stored in the microcomputer 11 will be described hereinafter with reference to FIG. 4.

The slave task (slave-task program P2) is launched when execution of an initializing process allows the bus BS to be used after the autonomous communicating slave 3b is powered on.

When the slave task is launched, the microcomputer 11 of the autonomous communicating slave 3b determines whether a header is received in step S210. When determining that a header is not received (NO in step S210), the microcomputer 11 determines whether a request of event communications is generated in the autonomous communicating slave 3b in step S240; this request indicates or includes specified data to be sent in the event mode. When determining that no request of event communications are generated in the local autonomous communicating slave 3b (the corresponding slave 3b itself) (NO in step S240), the microcomputer 11 returns to step S210, and repeats the determinations in step S210 and S240 until the determination of any of steps S210 and S240 is affirmative.

If it is determined that a header is received (YES in step S210), the microcomputer 11 determines whether a value of the received header is changed from a predetermined value of the header defined by the parity bit in step S230. If it is determined that the value of the received header is changed from the predetermined value of the header (YES in step S230), the microcomputer 11 determines that a parity error has occurred in the received header, and abandons the received header, returning to step S210 and repeating the operations from step S210. Otherwise, if it is determined that the value of the received header is unchanged from the predetermined value of the header (NO in step S230), the microcomputer 11 determines whether the ID set to the received header is matched with the ID (local ID) of data to be transmitted from the local node (the corresponding node itself) in step S310.

If it is determined that the ID set to the received header is matched with the local ID (YES in step S310), the microcomputer 11 determines that the received header is a regular header or an event header with the ID indicative of data included in the local node (the corresponding node). Then, the microcomputer 11 performs a response transmission/reception routine in step S320. Thereafter the microcomputer 11 returns to step S210 and repeatedly performs the slave task from step S210.

On the other hand, if it is determined that a request of event communications is generated in the local autonomous communicating slave 3b (YES in step S240), the microcomputer 11 determines whether IFS is detected by the idle state detector 18, in other words, whether the idle detection signal IDL is the active level in step S250. If it is determined that IFS is not detected by the idle state detector 18 (NO in step S250), the microcomputer 11 returns to step S210 and repeatedly performs the slave task from step S210. Otherwise, if it is determined that IFS is detected by the idle state detector 18 (YES in step S250), the microcomputer 11 transmits an event header consisting of an ID of the specified data by the request of event communications in step S260.

After completion of the sending of an event header in step S260, the microcomputer 11 receives a header via the bus BS, and determines whether the receipt of the header is completed in step S270.

If it is determined that the receipt of the header is not completed (NO in step S270), the microcomputer 11 repeats the determination in step S270. Otherwise, if it is determined that the receipt of the header is completed (YES in step S270), the microcomputer 11 determines whether a value of the received header is changed from a predetermined value of the header defined by the parity bit in step S280. If it is determined that the value of the received header is changed from the predetermined value of the header (YES in step S280), the microcomputer 11 determines a parity error has occurred in the received header, and abandons the received header, returning to step S210 and repeating the operations from step S210.

Otherwise, if it is determined that the value of the received header is unchanged from the predetermined value of the header (NO in step S280), the microcomputer 11 determines whether the ID (received ID) set to the received header is matched with the ID (transmitted ID) set to the header transmitted in step S260 in step S290.

If it is determined that the received ID is matched with the transmitted ID (YES in step S290), the microcomputer 11 determines that the transmitted header in step S360 wins on bus arbitration, and clears a retransmit flag in step S300; this retransmit flag has been automatically set since timing when a header was transmitted in step S260. Thereafter, the microcomputer 11 proceeds to step S310. Otherwise, if it is determined that the received ID is not matched with the transmitted ID (NO in step S170), the microcomputer 11 determines that the transmitted ID loses on bus arbitration so that the received header in step S270 wins on bus arbitration, proceeding to step S310 without clearing the retransmit flag.

In step S240, if the retransmit flag has been set, the microcomputer 11 performs an affirmative determination, in other words, determines that a request of event communications is generated in the local autonomous communicating slave 3b.

That is, the slave task to be executed by the microcomputer of the autonomous communicating slave 3b is programmed to transmit an event header in response to the occurrence of a request of event communications, and retry, if the transmitted header loses on bus arbitration, to transmit the same event header until the transmitted header wins on bus arbitration.

In addition, the slave task to be executed by the microcomputer 11 of the autonomous communicating slave 3b is also programmed to perform the response transmission/reception routine in step S320 described later if the received ID set to the received header is matched with the local ID of the corresponding local node (YES in step S310), and receive a response in step S330 described later if the received ID set to the receive header is not matched with the local ID of the corresponding node (NO in step S310).

Figure 4:
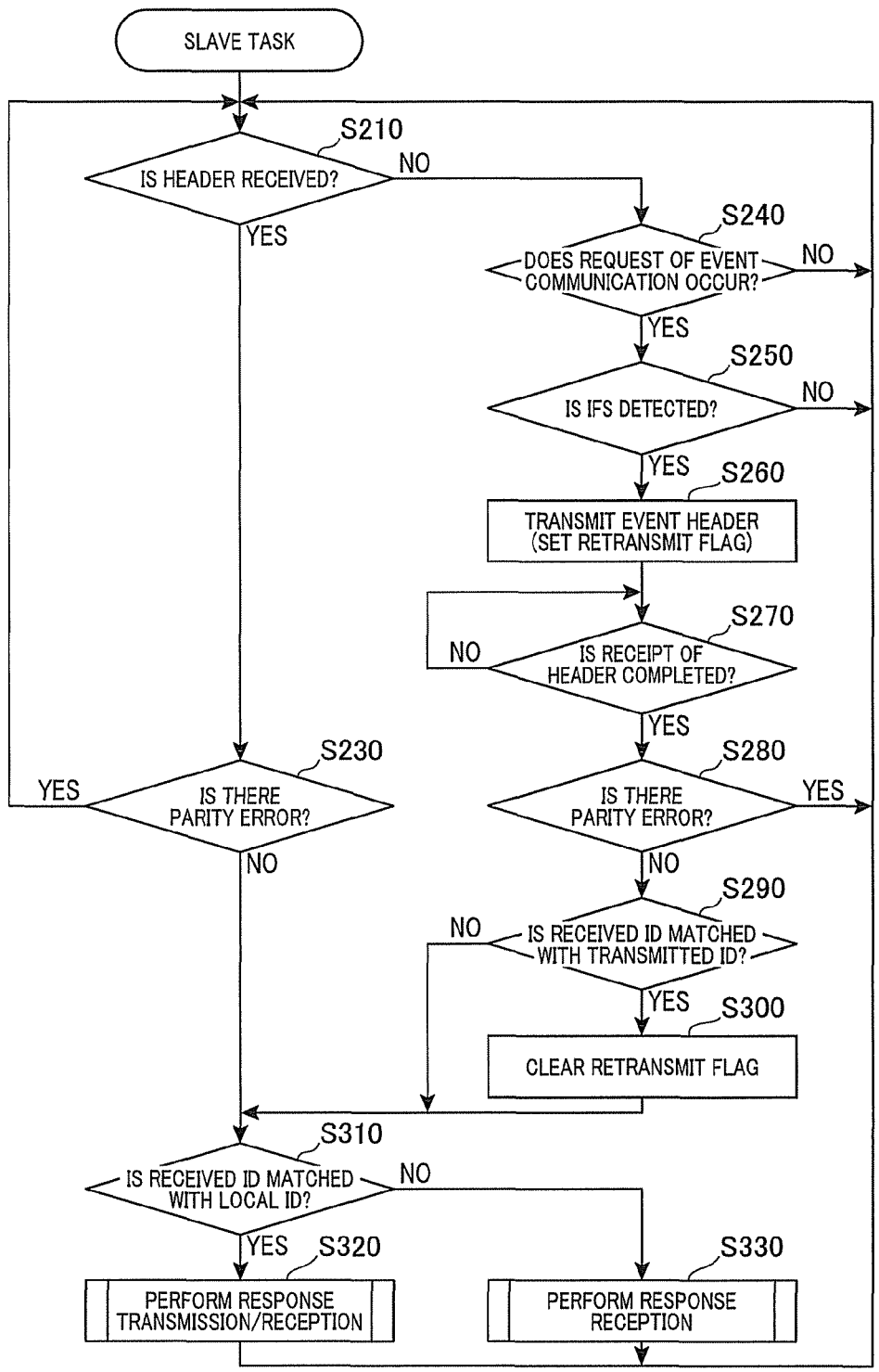
FIG. 4 is a flowchart schematically illustrating a slave task to be carried out by the microcomputer of an autonomous communicating slave of the communication system according to the embodiment.

Note that the slave task to be executed by the microcomputer 11 of each of the available slave 2a and the master 1 is designed such that the operations in steps S240 to S300 are omitted from the flowchart of the slave task to be executed by the microcomputer 11 of the autonomous communicating slave 3b illustrated in FIG. 4.

Next, the response transmission/reception routine to be executed by the microcomputer 11 in step S320 will be fully described hereinafter with reference to FIG. 5.

When the response transmission/reception routine is launched after the operation in step S310, the microcomputer 11 resets an arbitration loss flag described later if the arbitration loss flag has bee set in step S400. Thereafter, the microcomputer 11 determines whether the arbitration loss flag is set in step S410.

If it is determined that the arbitration loss flag is not set (the arbitration loss flag is reset, NO in step S410), the microcomputer 11 proceeds to step S420.

In step S420, if a regular header is received in step S210 (YES in step S210), the microcomputer 11 causes the UART 11a to transmit, in the regular communication mode, one block of a frame to be transmitted, that is, a part of the frame consisting of the received header and a response including the data that the master 1 allows to send in step S420.

In step S420, if an event is generated (YES in step S240), a received ID is matched with the transmitted ID of the transmitted event header (YES in step S290), and the transmitted ID represents the ID of data included in the corresponding local node (YES in step S310), the microcomputer 11 causes the UART 11a to transmit, in the event communication mode, one block of a response including data specified by the transmitted event header, that is, a part of the response specified by the transmitted event header in step S420.

In step S420, if an event header is transmitted in step S130, the microcomputer 11 causes the UART 11a to transmit, in the event mode, one block of a response including data specified by the transmitted event header, that is, a part of the response specified by the transmitted event header in step S420.

Otherwise, if it is determined that the arbitration loss flag is set (YES in step S410), the microcomputer 11 skips the operation in step S420 without transmitting data, proceeding to step S430.

In step S430, the microcomputer 11 determines whether the UART 11a has received one block of data from the bus BS. If it is determined that the UART 11a has not received one block of data (NO in step S430), the microcomputer 11 determines whether a receipt timeout occurs in step S440. If it is determined that the receipt timeout does not occur in step S440 (NO in step S440), the microcomputer 11 repeats the operations in steps S430 and S440 until the UART 11a has received one block of data or the receipt timeout occurs.

Note that whether the receipt timeout occurs means whether an elapsed time during receipt of a current one block of data from another node or the local node since the receipt of the previous one block of data reaches a predetermined allowed time. If the elapsed time during the receipt of the current one block of data since the receipt of the previous one block of data is within the predetermined allowed time (NO in step S440), the microcomputer 11 determines that the previous one block of data and the current one block of data constitute the same response.

If it is determined that the receipt timeout occurs (YES in step S440), when there is data that has been already received in the same response transmission/reception routine, the microcomputer 11 abandons the data in step S490, terminating the response transmission/reception routine.

Otherwise, if it is determined that the UART 11a has received one block of data before the receipt timeout occurs (YES in step S430), the microcomputer 11 determines whether the received one block of data (referred to as "received block") is matched with the one block (referred to as "transmitted block") of data transmitted in step S420 in step S450.

If it is determined that the received block is not matched with the transmitted block (NO in step S450), the microcomputer 11 sets the arbitration loss flag in step S460, proceeding to step S470. Note that, if the local node has not transmitted one block of data in step S420 (if the operation in step S420 has been skipped), it is determined that that the received block is not matched with the transmitted block in step S450.

Otherwise, if it is determined that the received block is matched with the transmitted block (YES in step S450), the microcomputer 11 skips the operation in step S460, proceeding to step S470.

In step S470, the microcomputer 11 determines, based on, for example, the size information included in the received block, whether the receipt of a set of (series of) data is completed; the set of data constitutes either the frame consisting of the received header and the response corresponding thereto or the response specified by the transmitted event header.

If it is determined that the receipt of the set of data constituting the message or the response is not completed (NO in step S470), the microcomputer 11 returns to step S410 and repeatedly performs the operations from step S410. Otherwise, if it is determined that the receipt of the set of data constituting the message or the response is completed (YES in step S470), the microcomputer 11 checks the CRC code included in the response of the received message or the received response to determine whether the received CRC code is matched with a CRC code calculated from the response of the received message or the received response in step S480.

If it is determined that the received CRC code is matched with the calculated CRC code, thus determining that there are not CRC errors in the response of the received message or the received response (YES in step S480), the microcomputer 11 terminates the response transmission/reception routine, that is, the slave task illustrated in FIG. 4.

Otherwise, if it is determined that the received CRC code is not matched with the calculated CRC code, thus determining that there is a CRC error in the response of the received message or the received response (NO in step S480), the microcomputer 11 abandons the received message or the received response in step S490, terminating the response transmission/reception routine, that is, the slave task illustrated in FIG. 4.

Specifically, the slave task to be executed by the microcomputer of the autonomous communicating slave 3b is programmed to not only transmit a response but also abort the transmission of one block of data while continuously receiving an alternative response if the one block of data loses on bus arbitration if the one block of data loses on bus arbitration with respect to the alternative response.

Figure 6:
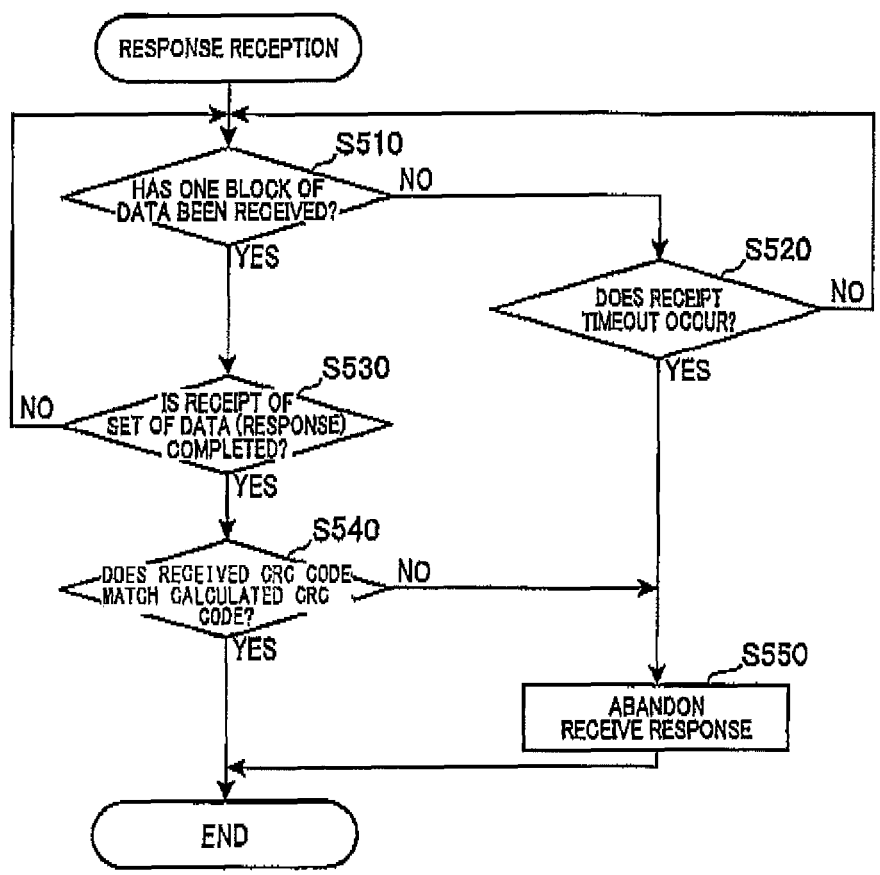
FIG. 6 is a flowchart schematically illustrating a response reception routine to be executed by the microcomputer of the autonomous communicating slave in step S330 of FIG. 4.

Next, the response reception routine to be executed by the microcomputer 11 in step S330 will be fully described hereinafter with reference to FIG. 6.

When the response reception routine is launched in response to the negative determination in step S310, the microcomputer 11 determines whether the UART 11a has received one block of data from the bus BS in step S510. If it is determined that the UART 11a has not received one block of data (NO in step S510), the microcomputer 11 determines whether a receipt timeout occurs in step S520. If it is determined that the receipt timeout does not occur in step S520 (NO in step S520), the microcomputer 11 repeats the operations in steps S510 and S520 until the UART 11a has received one block of data or the receipt timeout occurs.

Note that whether the receipt timeout occurs means whether an elapsed time during receipt of a current one block of data from another node or the local node since the receipt of the previous one block of data reaches a predetermined allowed time. If the elapsed time during the receipt of the current one block of data since the receipt of the previous one block of data is within the predetermined allowed time (NO in step S520), the microcomputer 11 determines that the previous one block of data and the current one block of data constitute the same response.

If it is determined that the receipt timeout occurs (YES in step S520), when there is data that has been already received in the same response reception routine, the microcomputer 11 abandons the data in step S550, terminating the response reception routine.

Otherwise, if it is determined that the UART 11a has received one block of data before the receipt timeout occurs (YES in step S510), the microcomputer 11 determines, based on, for example, the size information included in the received block, whether the receipt of a set of (series of) data constituting a response is completed. If it is determined that the receipt of a set of data constituting a response is not completed (NO in step S530), the microcomputer 11 returns to step S510 and repeatedly performs the operations from step S510. Otherwise, if it is determined that the receipt of a set of data constituting a response is completed (YES in step S530), the microcomputer 11 checks the CRC code included in the received response to determine whether the received CRC code is matched with a CRC code calculated from the received response in step S540.

If it is determined that the received CRC code is matched with the calculated CRC code, thus determining that there are not CRC errors in the received response (YES in step S540), the microcomputer 11 terminates the response reception routine, that is, the slave task illustrated in FIG. 4.

Otherwise, if it is determined that the received CRC code is not matched with the calculated CRC code, thus determining that there is a CRC error in the received response (NO in step S540), the microcomputer 11 abandons the received response in step S550, terminating the response reception routine, that is, the slave task illustrated in FIG. 4.

Figure 5:
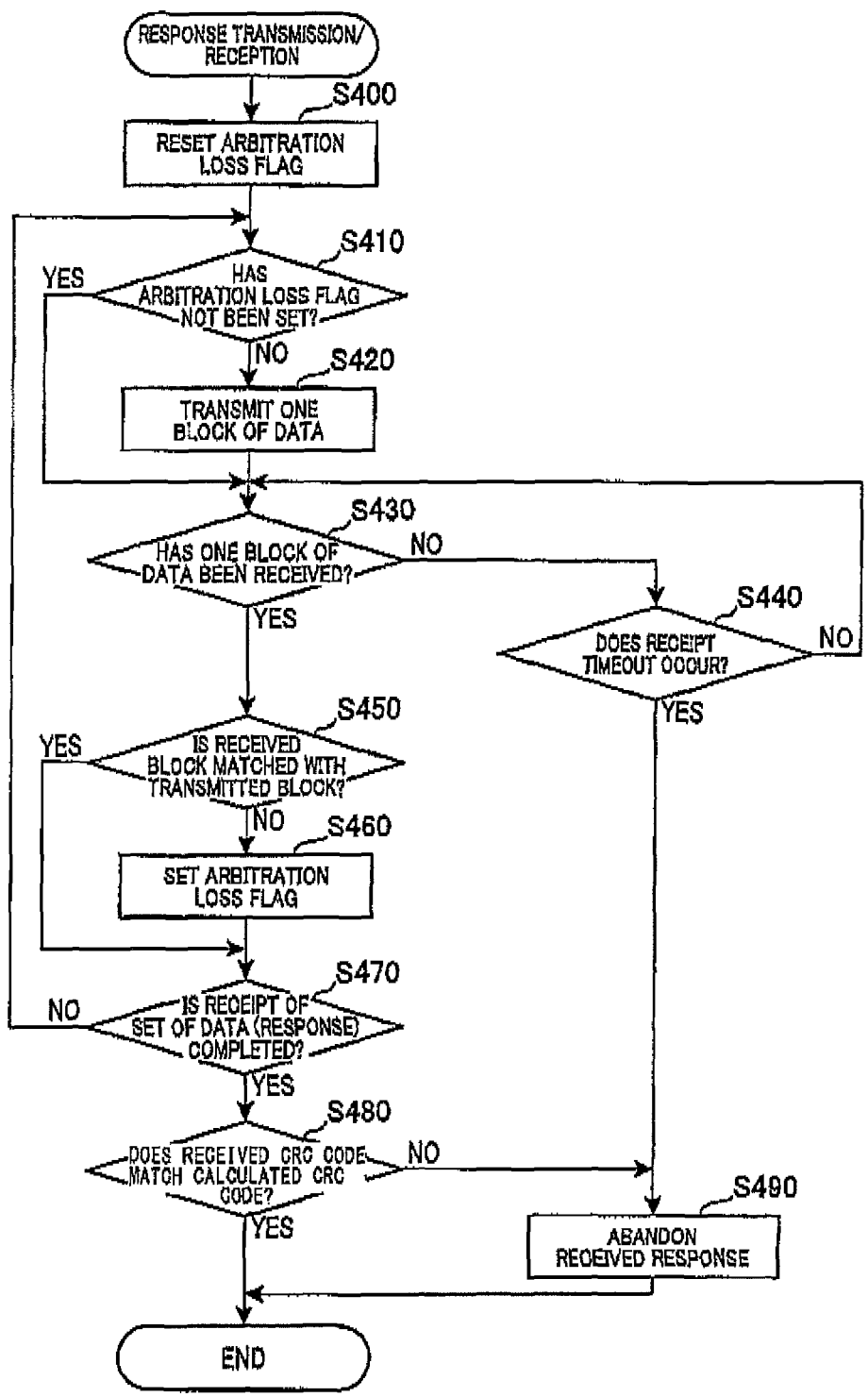
FIG. 5 is a flowchart schematically illustrating a response transmission/reception routine to be executed by the microcomputer of the autonomous communicating slave in step S320 of FIG. 4.

Specifically, the response reception routine is designed such that the response-transmission operations in steps S400 to S420 and S450 to S460 are omitted from the flowchart of the response transmission/reception routine illustrated in FIG. 5.

Figure 7:
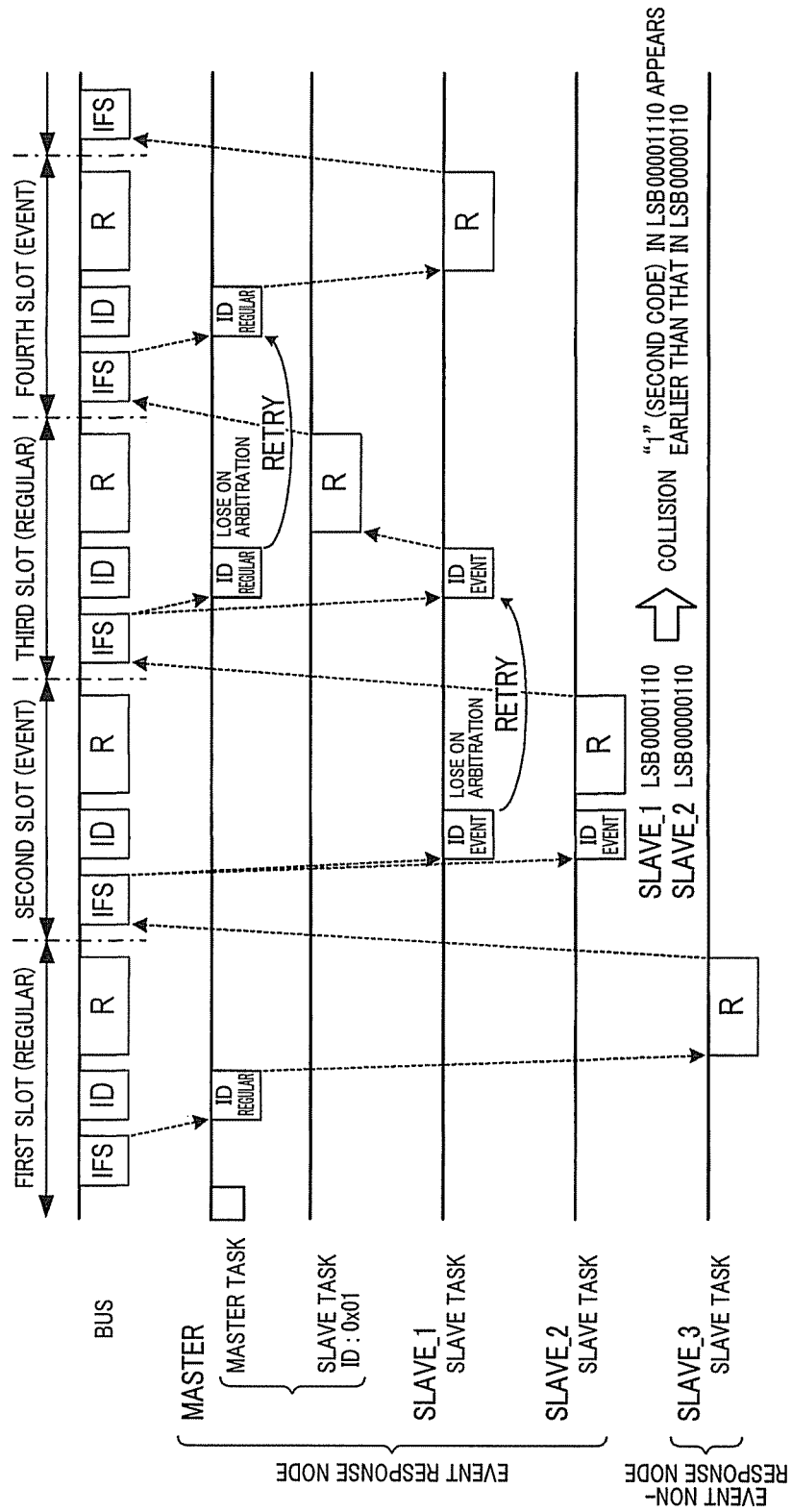
FIG. 7 is a timing chart schematically illustrating basic operations of the communication system according to the embodiment.

FIG. 7 is a timing chart schematically illustrating basic operations of the communication system according to this embodiment.

Figure 3:
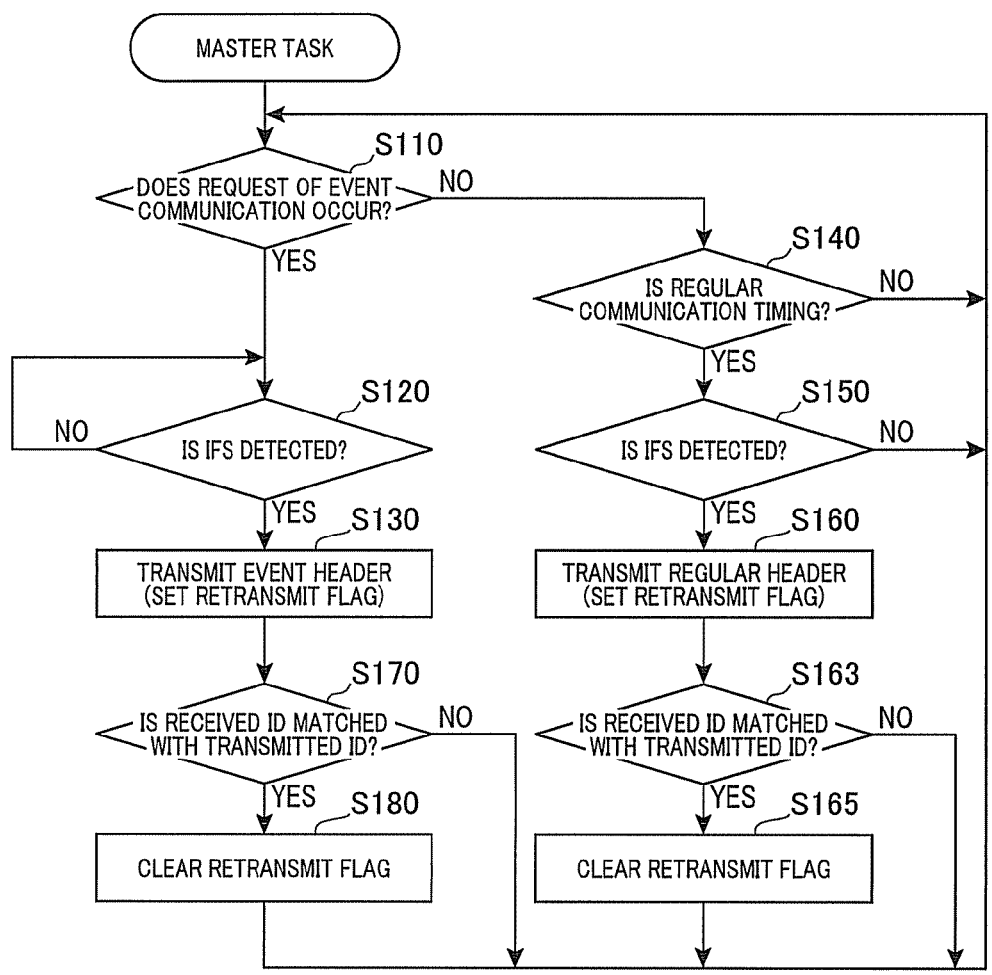
FIG. 3 is a flowchart schematically illustrating a master task to be carried out by the microcomputer of a master of the communication system according to the embodiment.

Referring to FIG. 7, the master task of the master 1 transmits, at previously determined regular intervals, a regular header consisting of an ID of data that the master 1 allows to send (see steps S140, 150, and S160 in FIG. 3, and see "ID REGULAR" in the first slot in FIG. 7). Note that the ID to be set to a regular header is updated in the previously established schedule such that all pieces of data, which should be shared by all the nodes connected to the bus BS, are successively specified.

If a request of event communications, which includes specified data to be sent in the event mode, is generated, each of the master task of the master 1 and the slave task of the autonomous communicating slave 3b transmits an event header consisting of an ID of the specified data by the request of event communications (see steps S110, S120, and S130 in FIG. 3, steps S240, S250, and S260 in FIG. 4, and "ID EVENT" in the second slot in FIG. 7). These master 1 and autonomous communicating slave 3b will be referred to as "event response nodes". Note that the ID of an event header is normally set to the ID of data to be transmitted from a corresponding local node as a sender in order to inform another node of the occurrence of the corresponding event, but can be set to the ID of data to be transmitted from an alternative node as a sender in order to, for example, collect information required for urgent processes in a corresponding local node. The transmission of any header (a regular header or an event header) is performed after detection of IFS.

When receiving a header, the slave task of each of the master 1 and a slave 3 (referred to simply as a node), transmits, if the ID set to the received header is ID of data to be transmitted from a corresponding local node as a sender, transmits the received header and a prepared response (prepared data) "R" following the received header independently of the received header being an event header or a regular header (see steps S210, S230, and S320 in FIG. 4, and see the first slot in FIG. 7).

The response transmitted set forth above is received by a node that requires the response (see step S330).

If some event response nodes transmit simultaneously event headers, there is a collision between the event headers. For example, in the second slot of FIG. 7, there is a collision between the event header "ID EVENT" transmitted from a slave_1 as the event response node and the event header "ID EVENT" transmitted from a slave_2 as the event response. In this case, if the ID of the event header from the slave_2, which is lower than the ID of the event header from the slave_1, is higher in priority than the ID of the event header from the slave_1, the event header transmitted from the slave_2 wins on bus arbitration.

For example, it is assumed that the ID of the slave_1 is represented as 8-bit binary data of LSB00001110, and the ID of the slave_2 is represented as 8-bit binary data of LSB00000110 lower than the ID (LSB00001110). When the slave_1 and the slave_2 simultaneously transmit their IDs (LSB00001110 and LSB00000110), because the first to fourth bits are all 0 (dominants), the same first codes corresponding to the dominants are simultaneously transmitted on the bus BS from the slave_1 and _2.

Because the ID of the slave_1 is higher than the ID of the slave_2, the recessive (1) appears in the ID of the slave_1 earlier than in the ID of the slave_2 (see the second slot in FIG. 7). That is, when the slave_1 and the slave_2 simultaneously transmit the fifth bit on the bus BS, because the fifth bit of the ID of the slave_1 is 1 (recessive) whereas the fifth bit of the ID of the slave _2 is 0 (dominant), the second code corresponding to the recessive and the first code corresponding to the dominant are simultaneously transmitted on the bus BS so that arbitration between the first code and the second code occurs on the bus BS.

As described above, because the dominant wins arbitration on the bus BS upon collision between the dominant and the recessive, the second and third recessives of the second code lose arbitration on the bus BS so that they are changed to the dominants (see (c) of FIG. 2). This results in that the second code transmitted from the slave_1 is changed to the first code on the bus BS.

At that time, the arbiter 17 of the slave_1 detects the mismatching between the second code of the fifth bit of the transmitted ID and the first code of the received ID as the received data RxD, thus changing the level of the collision detection signal CD from the inactive level to the active level.

As a result, the microcomputer 11 of the slave_1 performs negative determination in step S290, thus determining that the transmitted event header loses on bus arbitration. Then, the microcomputer 11 of the slave_1 disables the encoder 13 to output encoded data to stop the output of the encoder 13, thus stopping the transmission of the event header and a response while keeping the retransmit flag being set (see the skip of step S300).

In contrast, the level of the collision detection signal CD from the arbiter 17 of the slave_2 is kept at the inactive level because the arbiter 17 does not detect mismatching between the transmitted ID and the received ID as the received data RxD so that the transmitted event header from the slave_2 wins on bus arbitration. Thus, the microcomputer 11 of the slave_2 performs affirmative determination in step S290, thus continuing the transmission of the event header. After complete of transmission of the event header, the microcomputer 11 of the slave_2 transmits a response "R" specified by the event header (see step S320 in FIG. 4 and the second slot in FIG. 7).

At that time, the microcomputer 11 of the slave_1 with the transmitted event header losing on bus arbitration waits for detection of IFS, and thereafter repeatedly retries transmission of the event header until the transmission of the event header is successfully completed (see steps S240 to S290 and S300 in FIG. 4 and the second slot in FIG. 7).

Similarly, if a node transmits a regular header, and simultaneously, an event response node transmits an event header, there is a collision between the regular header and the event header. For example, in the third slot of FIG. 7, there is a collision between the regular header "ID REGULAR" transmitted from the master 1 and the event header "ID EVENT" transmitted from the slave_1. In this case, if the ID of the regular header from the master 1 is higher than the ID of the event header from the slave_1, the event header transmitted from the slave_1 wins on bus arbitration. Then, the microcomputer 11 of the slave_1 performs affirmative determination in step S290, thus continuing the transmission of the event header. After complete of transmission of the event header, the microcomputer 11 of the master 1 transmits a response "R" specified by the event header from the slave_1 (see steps S310 and S320 in FIG. 4 and the third slot in FIG. 7).

In contrast, the microcomputer 11 of the master 1 performs negative determination in step S170, thus determining that the transmitted regular header loses on bus arbitration. Then, the microcomputer 11 of the master 1 disables the encoder 13 to output encoded data to stop the output of the encoder 13, thus stopping the transmission of the regular header while keeping the retransmit flag being set (see the skip of step S180). Then, the microcomputer 11 of the master 1 with the transmitted regular header losing on bus arbitration waits for detection of IFS, and thereafter repeatedly retries transmission of the regular header until the transmission of the regular header is successfully completed (see steps S140 to S180 in FIG. 3 and the third slot in FIG. 7).

As described above, the communication system according to this embodiment is configured such that each event response node, such as the master 1 and the autonomous communicating slave 3b, waits for detection of IFS each time a request of event communications is generated, and thereafter transmits an event header consisting of an ID of data specified by the request of event communications. This configuration allows an event response node to immediately transmit an event header in response to the occurrence of a request of event communications without waiting for its own order of regular communications. This makes it possible to immediately transmit urgent information to another node and immediately receive urgent info illation from another node.

In addition, the communication system according to this embodiment is configured to, if there is collision between headers independently of their types (event headers, regular headers), transmit one of the headers, which wins on bus arbitration, and a response specified by the one of the headers. This configuration implements efficient communications among nodes.

The communication system according to this embodiment is configured to use, as available nodes 3a, nodes each making no transmissions of event headers without any variation to the nodes. This configuration makes it possible to construct the communication system using an available master-slave communication system.

The communication system according to this embodiment can provide the master 1 in plurality. In other words, the communication system can be constructed by a plurality of master-slave communication systems communicable via a single bus.

The embodiment of the present disclosure has been fully described, but the present disclosure is not limited to the embodiment, and can be modified or deformed within the scope thereof.

For example, in the embodiment, the communication system is applied as a communication system for vehicles, but can be applied as a communication system that needs to implement both the regular communication mode (passive communication mode) and the irregular communication mode (active communication mode). In the embodiment, using the encoder 13 and decoder 16 allows PWM-code data to be transmitted on the bus BS, but eliminating the encoder 13 and decoder 16 from each node allows NRZ-code data to be transmitted on the bus BS.

In the embodiment, each of the arbitrator 17 and the idle state detector 18 is configured to perform corresponding processes using transmit data TxD outputted from the encoder 13 and receive data RxD inputted to the decoder 16, but the present disclosure is not limited thereto. Specifically, each of the arbitrator 17 and the idle state detector 18 can be configured to perform corresponding processes using data Tx inputted to the encoder 13 and decoded data Rx outputted from the decoder 16.

The communication system according to the embodiment is configured not to intentionally control transmission timing of headers, but the present disclosure is not limited thereto. Specifically, priorities can be set on headers to be transmitted from an event response node (the master 1 or the autonomous communicating slave 3b), and the microcomputer 11 of an event response node according to a modification can be configured to transmit headers at plural timings based on the priorities of the headers.

That is, in the embodiment, each node uses the UART 11a to detect IFS and thereafter transmit a header. Because the time from detection of IFS to transmission of a header in each node depends on the properties of its UART 11a, there may be a variation between the header-transmission timings of respective nodes. In this case, even if some nodes simultaneously detect IFS and transmit their headers, there may be not bus arbitration because only one header at the most earliest header transmission timing is successfully transmitted. This may result in that a response corresponding to the transmitted header is transmitted following the transmitted header. That is, if there may be a variation between the header-transmission timings of respective nodes, a response corresponding to a header of a node with the earliest header-transmission timing is always transmitted earlier than a response corresponding to a header of another node.

However, the communication system according to the modification can be configured such that, even if some nodes simultaneously detect IFS and transmit their headers, one of the headers having the highest priority is transmitted preferentially, and thereafter, the other headers are successively transmitted according to the priorities of their transmission timings in each of steps S130, 160, and S260.

Figure 8:
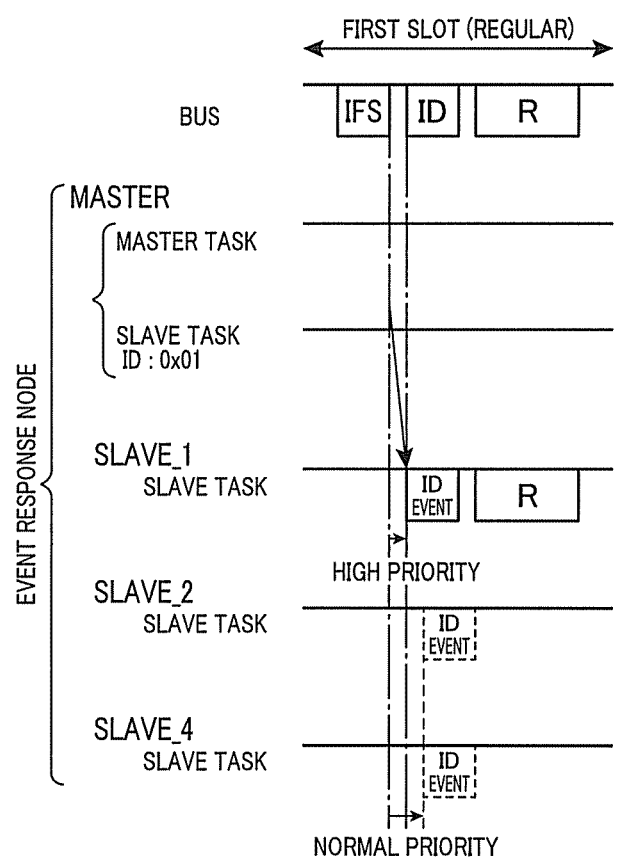
FIG. 8 is a timing chart schematically illustrating basic operations of a communication system according to a modification of the embodiment.

FIG. 8 is a timing chart schematically illustrating operations of the communication system according to the modification of the embodiment when event headers of the slave_2 and the slave 3 are set to normal priorities, and event headers of the slave_1 are set to high priorities higher than the normal priorities.

In the first slot for transmitting an event frame as an example, the slave task of each event response node (slave) 3 is configured to transmit a corresponding event header at a timing defined based on its priority after detection of IFS. For example, as illustrated in FIG. 8, when event response slaves_1, _2, and _4 want to transmit their event headers in the same first slot, the event-header transmitting timing of the slave_1 is set to be earlier than that of each of the slave_2 and _4 because event headers of the slave_1 are higher in priority than those of the slave_2 and _4. Thus, an event header and a corresponding response of the slave_1 are only transmitted on the bus BS (see step S260 and YES in step S290).

This modification makes it possible to reliably implement communications of pieces of data among nodes according to the priorities of the pieces of data.

While illustrative embodiments of the present disclosure has been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be constructed as non-exclusive.

What is claimed is:

1. A communication system comprising:
  a bus;
  a master node; and
  a plurality of slave nodes communicably coupled to the master node through the bus;
  wherein
    information is communicated on the bus as signals, each of the signals having an electrical dominant level thereon and an electrical recessive level thereon, the electrical dominant level being asserted on the bus in priority to the electrical recessive level;
    at least one of the plurality of slave nodes is constructed as at least one autonomous communicating slave node that autonomously transmits data without receiving data associated with the at least one autonomous communication slave node, the at least one slave node being configured to autonomously transmit a corresponding header indicative of data required to be autonomously transmitted via the bus;
    the master node is configured to transmit a corresponding header with an identification of data selected by the master node to be transmitted; one of the plurality of slave nodes including the data selected by the master node to be transmitted is configured to receive the corresponding header from the master node and transmit the received header from the master node and the data selected by the master node to be transmitted following the received header;
    each of the master node and the at least one autonomous communicating slave node is configured to:
    detect that the bus is in an idle state when the electrical recessive level on the bus is continued for a predetermined period or more;
    transmit the corresponding header via the bus after detection of the bus being in the idle state; and
    perform arbitration on the bus based on the corresponding header.

2. The communication system according to claim 1, wherein priorities are set on the headers respectively corresponding to the master node and the at least one autonomous communicating slave node, and one of the headers respectively corresponding to the master node and the at least one autonomous communicating slave node higher in priority than another of the headers respectively corresponding to the master node and the at least one autonomous communicating slave node is transmitted from a corresponding one of the master node and the at least one autonomous communicating slave node to be earlier than the another of the headers respectively corresponding to the master node and the at least one autonomous communicating slave node from a corresponding one of the master node and the at least one autonomous communicating slave node.

3. The communication system according to claim 1, wherein each of the master node and the plurality of slave nodes is configured to transmit a corresponding header when a corresponding node wins the arbitration on the bus between the corresponding header and an alternative header transmitted from one of the other nodes.

4. A master node communicably coupled to a plurality of slave nodes through a bus, in which information is communicated on the bus as signals, each of the signals having an electrical dominant level thereon and an electrical recessive level thereon, the electrical dominant level being asserted on the bus in priority to the electrical recessive level, the master node comprising:
  an idle state detector configured to detect the bus is in an idle state when the electrical recessive level on the bus is continued for a predetermined period or more;
  a regular header transmitter configured to transmit, via the bus, a regular header with an identification of data selected by the master node to be transmitted after detection of the bus being in the idle state, one of the plurality of slave nodes including the data selected by the master node being configured to receive the regular header and transmit the received regular header and the data selected by the master node to be transmitted following the regular header; and
  a stop unit configured to monitor electrical signal level on the bus and stop transmission of the regular header when the monitored electrical signal level on the bus is different from an electrical signal level of the transmitted regular header on the bus.

5. A slave node communicably coupled to a master node through a bus, in which information is communicated on the bus as signals, each of the signals having an electrical dominant level thereon and an electrical recessive level thereon, the electrical dominant level being asserted on the bus in priority to the electrical recessive level, the slave node comprising:
- a first transmitter configured to, when a regular header with an identification of data selected by the master node to be transmitted is transmitted, receive a regular header and to transmit, via the bus, the received regular header and the data selected by the master node following the regular header if the data selected by the master node is included in the slave node;
- an idle state detector configured to detect the bus is in an idle state when the electrical recessive level on the bus is continued for a predetermined period or more;
- an event header transmitter configured to autonomously transmit, without receiving data associated with the slave node, a corresponding event header indicative of data required to be autonomously transmitted via the bus; and
- a stop unit configured to monitor electrical signal level on the bus and stop transmission of at least one of the regular header and the event header when the monitored electrical signal level on the bus is different from an electrical signal level of the transmitted at least one of the regular header and the event header on the bus.

* * * * *